(12) United States Patent
Ryu

(10) Patent No.: US 7,948,594 B2
(45) Date of Patent: May 24, 2011

(54) METHOD OF MANUFACTURING DISPLAY APPARATUS COMPRISING FORMING AN OPAQUE MATERIAL LAYER HAVING FIRST AND SECOND THICKNESSES ON A TRANSPARENT CONDUCTIVE LAYER

(75) Inventor: Hye-Young Ryu, Seoul (KR)

(73) Assignee: Samsung Electronics Co., Ltd. (KR)

( * ) Notice: Subject to any disclaimer, the term of this patent is extended or adjusted under 35 U.S.C. 154(b) by 260 days.

(21) Appl. No.: 12/101,079

(22) Filed: Apr. 10, 2008

(65) Prior Publication Data

US 2009/0141227 A1    Jun. 4, 2009

(30) Foreign Application Priority Data

Apr. 12, 2007    (KR) .................. 10-2007-0036028

(51) Int. Cl.
  *G02F 1/1343*    (2006.01)
  *G02F 1/13*    (2006.01)
(52) U.S. Cl. ........................................ 349/139; 349/187
(58) Field of Classification Search .................. 349/139, 349/162
  See application file for complete search history.

(56) References Cited

U.S. PATENT DOCUMENTS

| 2005/0117093 | A1 | 6/2005 | Kim et al. |
| 2007/0058097 | A1* | 3/2007 | Kato et al. ....................... 349/38 |

FOREIGN PATENT DOCUMENTS

| CN | 1624548 A | 6/2005 |
| EP | 1 462 846 A2 | 2/2004 |
| JP | 01092721 A * | 4/1989 |
| JP | 2004-206112 | 7/2004 |
| JP | 2006-079036 | 3/2006 |
| KR | 1020050001516 | 1/2005 |
| KR | 1020050052731 | 6/2005 |
| KR | 1020050052732 | 6/2005 |
| KR | 1020050105044 | 11/2005 |

OTHER PUBLICATIONS

English Abstract, Publication No. JP2004-206112.
English Abstract, Publication No. KR1020050001516.
English Abstract, Publication No. KR1020050052731.
English Abstract, Publication No. KR1020050052732.
English Abstract, Publication No. KR1020050105044.

* cited by examiner

*Primary Examiner* — Mark A Robinson
*Assistant Examiner* — Dennis Y Kim
(74) *Attorney, Agent, or Firm* — Innovation Counsel LLP

(57) ABSTRACT

A display substrate includes a transparent insulating substrate, a transparent common electrode, a dummy pattern and a key pattern. The transparent insulating substrate has a display area and a non-display area. Images are displayed in the display area, and the non-display area surrounds the display area. The transparent common electrode is formed in the display area of the insulating substrate. The dummy pattern is formed in the non-display area of the insulating substrate. The dummy pattern is formed from the same material as the common electrode. The key pattern is formed on the dummy pattern. The key pattern may include a metal or an opaque photoresist. Therefore, a process of manufacturing the display substrate may be simplified.

11 Claims, 8 Drawing Sheets

330  395    310    320    322

330  340    310      320

METHOD OF MANUFACTURING DISPLAY APPARATUS COMPRISING FORMING AN OPAQUE MATERIAL LAYER HAVING FIRST AND SECOND THICKNESSES ON A TRANSPARENT CONDUCTIVE LAYER

CROSS-REFERENCE TO RELATED APPLICATIONS

This application claims priority under 35 U.S.C. §119 to Korean Patent Application No. 2007-36028, filed on Apr. 12, 2007 in the Korean Intellectual Property Office (KIPO), the contents of which are herein incorporated by reference in their entirety.

BACKGROUND OF THE INVENTION

1. Field of the Invention

The present invention relates to a display substrate, a method of manufacturing the display substrate, and a display device having the display substrate. More particularly, the present invention relates to a display substrate used for a display device, a method of manufacturing the display substrate, and a display device having the display substrate.

2. Description of the Related Art

A liquid crystal display (LCD) device, in general, includes a thin-film transistor (TFT) layer formed on a lower substrate, a color filter layer formed on an upper substrate facing the TFT layer and a liquid crystal layer interposed between the TFT layer and the color filter layer.

The TFT layer includes signal lines, a thin film transistor TFT, and a pixel electrode that drives a plurality of pixels. The signal lines, the TFT and the pixel electrode are formed on the lower substrate. The color filter layer includes a color filter, a black matrix and a common electrode. The color filter includes red (R), green (G) and blue (B) color filters. The black matrix is formed on a boundary portion between the color filters. The common electrode faces the pixel electrode.

In order to prevent display defects caused by a misalignment of the LCD device, an LCD device of a color filter on array (COA) substrate type has been devised. A color filter layer is formed on the TFT layer of the COA-type LCD device.

The color filter layer further includes a key pattern for an alignment between the TFT layer and the color filter layer. The color filter layer having the black matrix requires an overcoating layer for planarizing a surface of the color filter layer. As a result, a process of manufacturing the color filter layer is complicated and light transmittance is decreased by the overcoating layer.

SUMMARY OF THE INVENTION

A display substrate capable of simplifying a process of manufacturing the display substrate is provided.

A method of manufacturing the above-mentioned display substrate is also provided.

The present invention still also provides a display device having the above-mentioned display substrate.

A display substrate in accordance with one aspect of the present invention includes a first substrate including a pixel part, a second substrate including a display area and a non-display area, wherein the display area displays images, and the non-display area surrounds the display area, and further wherein the first substrate faces to the second substrate. A transparent common electrode is formed in the display area, and a dummy pattern is formed in the non-display area, the dummy pattern being formed from a same material as the common electrode, and a key pattern made of opaque material is formed on the dummy pattern. The key pattern may comprise either an opaque metal or an opaque photoresist. The common electrode includes an opening pattern and the key pattern can also be formed of the same material as the common electrode. The common electrode also may comprise a protrusion pattern formed on the common electrode.

A display substrate in accordance with another aspect of the present invention includes a first substrate including a pixel part, a second substrate including a display area and a non-display area, wherein the display area displays images and the non-display area surrounds the display area, and further wherein the first substrate faces to the second substrate. A liquid crystal layer is interposed between the first substrate and the second substrate. In addition, the first substrate comprises a thin film transistor (TFT) layer including a plurality of TFTs, a color filter layer formed on the TFT layer, and a pixel electrode formed on the color filter layer.

A method of manufacturing a display substrate in accordance with another aspect of the present invention is provided as follows. A first substrate is formed, and then a second substrate is formed, the second substrate including a display area and a non-display area, in which the first substrate faces to the second substrate. A transparent conductive layer is formed on a transparent insulating substrate of the second substrate, and an opaque material layer is formed on the transparent conductive layer. The transparent conductive layer and the opaque material layer are patterned to form a transparent common electrode, a dummy pattern and an opaque pattern including a key pattern which is formed on the dummy pattern, wherein the opaque pattern is not formed on the transparent common electrode being formed in the display area, and is formed on the dummy pattern being formed in the non-display area. The opaque material layer can be an opaque metal or an opaque photoresist.

A method of manufacturing a display substrate in accordance with still another aspect of the present invention is provided as follows. A photoresist pattern is formed on the opaque metal layer, the photoresist pattern having a first thickness over the dummy pattern and the key pattern region and a second thickness that is smaller than the first thickness over the common electrode. The photoresist pattern is formed through a photolithography process using a half-tone mask or a slit mask. The forming of the transparent common electrode, the dummy pattern and the key pattern comprises: patterning the opaque metal layer and the transparent conductive layer by using the photoresist pattern, ashing the photoresist pattern so that the opaque metal layer on the common electrode is exposed, etching the opaque metal layer on the transparent common electrode by using an ashed photoresist pattern and finally, stripping the ashed photoresist pattern.

A method of manufacturing a display substrate in accordance with still another aspect of the present invention is provided as follows. The transparent conductive layer and the opaque photoresist are patterned to form a transparent common electrode, a dummy pattern and an opaque photoresist pattern including a key pattern which is formed on the dummy pattern, wherein the opaque photoresist pattern is not formed on the transparent common electrode being formed in the display area, and is formed on the dummy pattern being formed in the non-display area. The opaque photoresist pattern is formed through a photolithography process using a half-tone mask or a slit mask. The opaque photoresist pattern comprises a positive-type photoresist or a negative-type photoresist.

A method of manufacturing a display substrate in accordance with still another aspect of the present invention is provided as follows. A transparent conductive layer is formed on a transparent insulating substrate. An opaque photoresist pattern is formed on the transparent conductive layer. The opaque photoresist pattern has a first thickness in a key pattern region and a second thickness that is smaller than the first thickness in a common electrode region. A transparent common electrode and a dummy pattern are formed through a patterning process using the opaque photoresist pattern. The transparent common electrode is formed in a display area of the insulating substrate from the transparent conductive layer, and the dummy pattern is formed in a non-display area of the insulating substrate from the transparent conductive layer. The opaque photoresist pattern is ashed to form a key pattern so that the common electrode is exposed. The key pattern is formed on the dummy pattern from the opaque photoresist pattern. The opaque photoresist pattern is formed through a photolithography process using a half-tone mask or a slit mask.

A method of manufacturing a display substrate in accordance with still another aspect of the present invention is provided as follows. A transparent conductive layer and a metal layer are sequentially formed on a transparent insulating substrate. A photoresist pattern is formed on the metal layer. The photoresist pattern has a first thickness in a key pattern region and a second thickness that is smaller than the first thickness in a common electrode region. A transparent common electrode, a dummy pattern and a key pattern are formed through a patterning process using the photoresist pattern. The common electrode is formed in a display area of the insulating substrate from the transparent conductive layer. The dummy pattern is formed in a non-display area of the insulating substrate from the transparent conductive layer. The key pattern is formed on the dummy pattern from the metal layer. The photoresist pattern is formed through a photolithography process using a half-tone mask or a slit mask.

A process of manufacturing the display substrate may be simplified, and manufacturing costs may be decreased.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
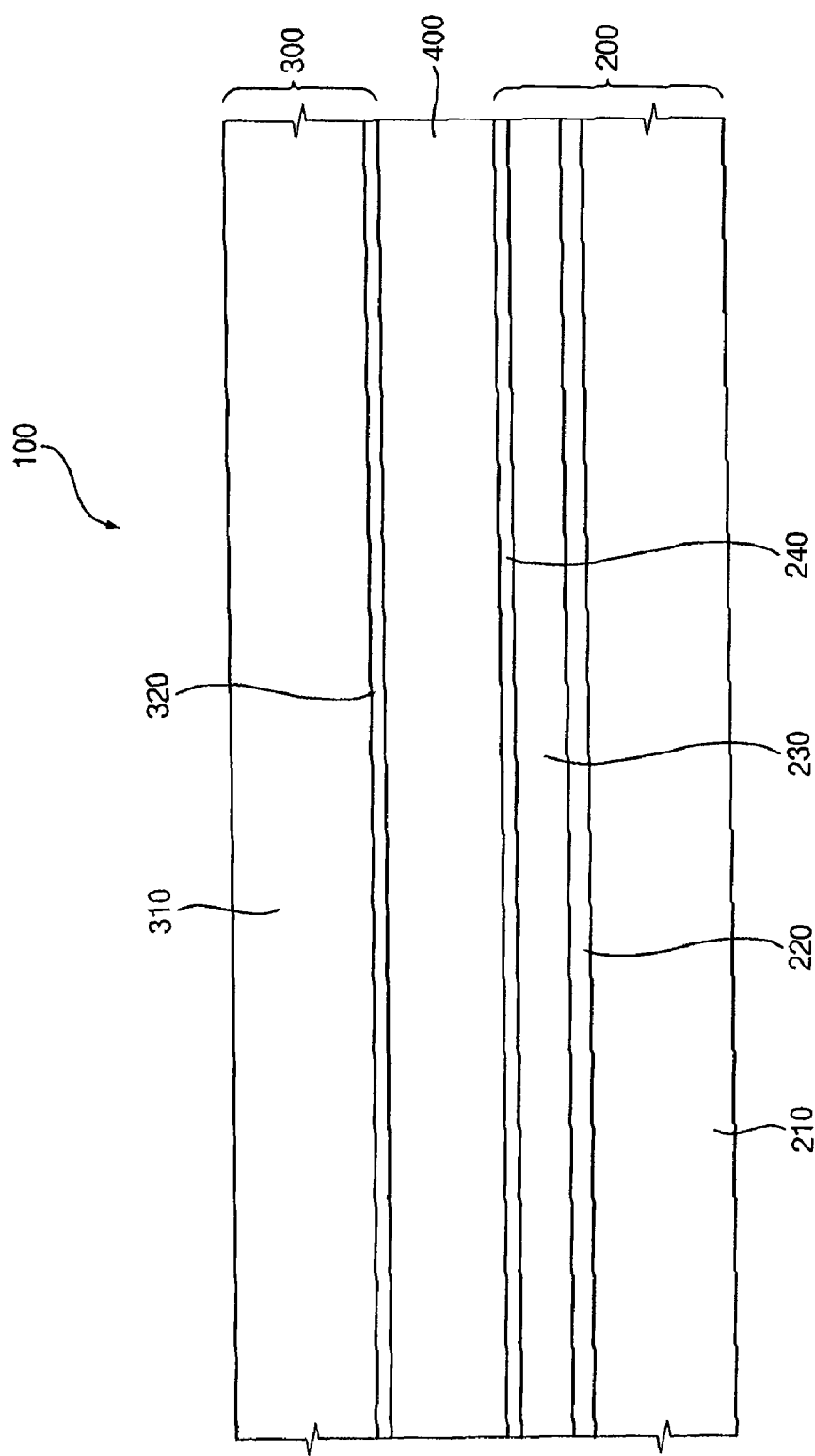
FIG. 1 is a cross-sectional view illustrating a display device according to one exemplary embodiment of the present invention.

The invention is described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a cross-sectional view illustrating a display device according to an exemplary embodiment of the present invention.

Referring to FIG. 1, a display device 100 includes a first display substrate 200, a second display substrate 300 and a liquid crystal layer 400. The liquid crystal layer 400 is interposed between the first display substrate 200 and the second display substrate 300.

The first display substrate 200 includes a first insulating substrate 210, a thin-film transistor (TFT) layer 220, a color filter layer 230 and a pixel electrode layer 240.

The first insulating substrate 210 comprises a transparent material, such as glass or plastic.

The TFT layer 220 is formed on the first insulating substrate 210. The TFT layer 220 includes a plurality of pixel parts that are independently driven. The TFT layer 220 may include a gate line, a data line, a thin film transistor TFT, and a protective layer. The data line is electrically insulated from the gate line by a gate insulating layer. The data line crosses the gate line. The TFT is electrically connected to the gate line and the data line. The protective layer covers the data line and the thin film transistor TFT.

The color filter layer 230 is formed on the TFT layer 220. For example, the color filter layer 230 may include a red color filter including a red colorant, a green color filter including a green colorant and a blue color filter including a blue colorant. The red, green and blue color filters may be regularly arranged on the TFT layer 220. For example, the red, green and blue color filters correspond to the pixel parts, respectively.

A thickness of the color filter layer 230 may be increased to planarize a surface of the first display substrate 200. For example, the thickness of the color filter layer 230 may be about 2.5 μm to about 3.5 μm.

Generally, an organic layer (not shown) covers the TFT layer 220 to planarize the first display substrate 200. However, in this embodiment, the color filter layer 230 is formed in the first display substrate 200 instead of the organic layer. Therefore, light transmittance may be increased by about 7%, and manufacturing costs may be decreased.

The pixel electrode layer 240 formed on the color filter layer 230 includes a pixel electrode (not shown) and an opening pattern. The pixel electrode is made of a transparent conductive material, through which light may be transmitted, for example, indium tin oxide (ITO), indium zinc oxide (IZO). These may be used alone or in a combination thereof.

The pixel electrodes electrically connected to the drain electrode of the TFT through a contact hole formed through the color filter layer 230.

The TFT applies data voltage, which is transferred through the data line, to the pixel electrode, when the TFT receives a gate voltage through the gate line.

The opening pattern of the pixel electrode layer 240 may divide each of pixel parts into a plurality of domains to increase a viewing angle. Additionally, the pixel electrode layer 240 may further include a main and sub-electrodes that are electrically separated from each other.

The main and sub-electrodes may receive different voltages, respectively.

When the pixel electrode includes the main electrode and the sub-electrodes, each of the pixel parts may include at least two TFTs that are connected to the main electrode and the sub-electrode, respectively.

The second display substrate 300 faces to the first display substrate 200 with the liquid crystal layer 400 interposed therebetween.

Figure 2:
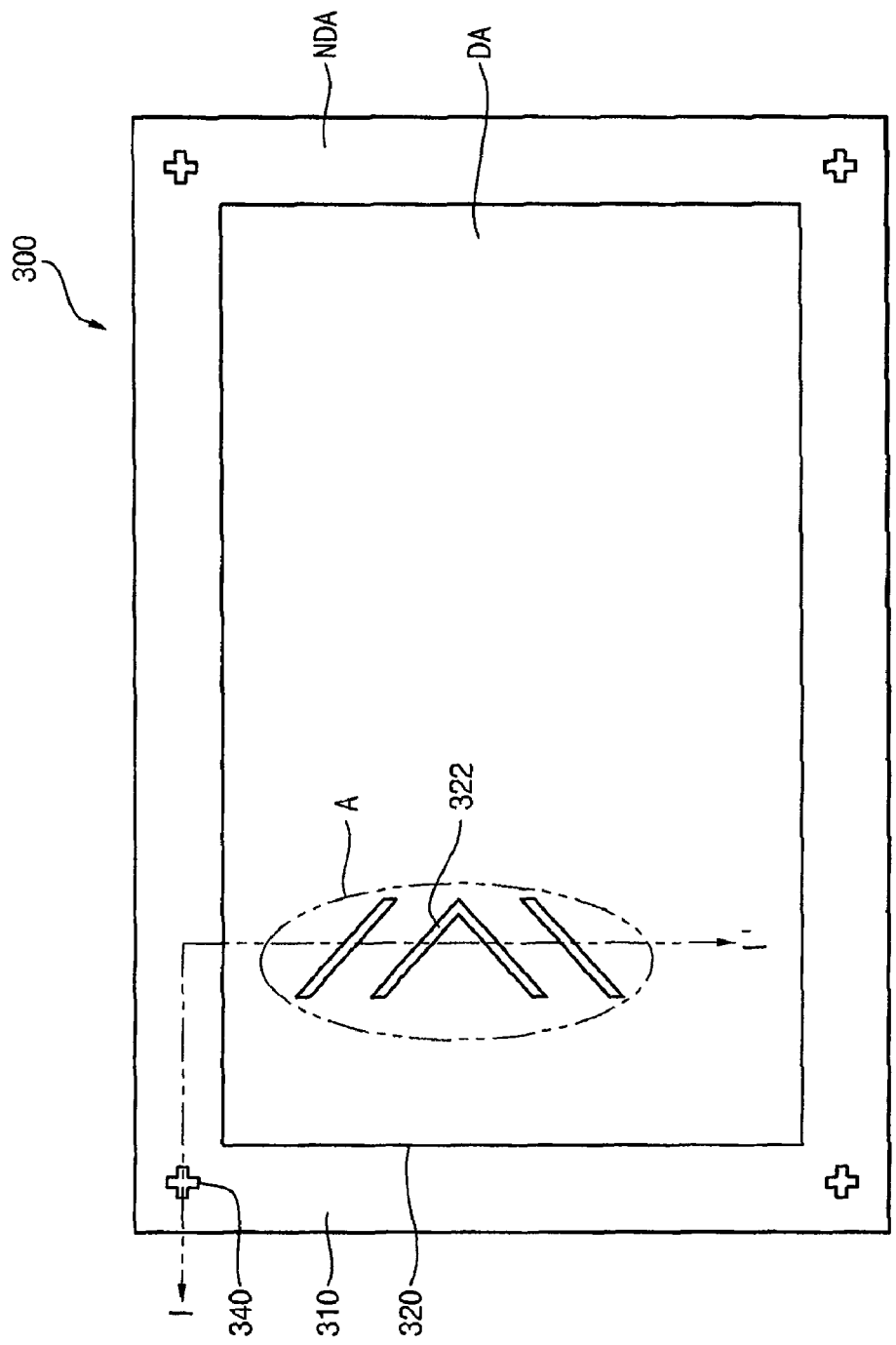
FIG. 2 is a plan view illustrating a second display substrate in FIG. 1.
Figure 3:
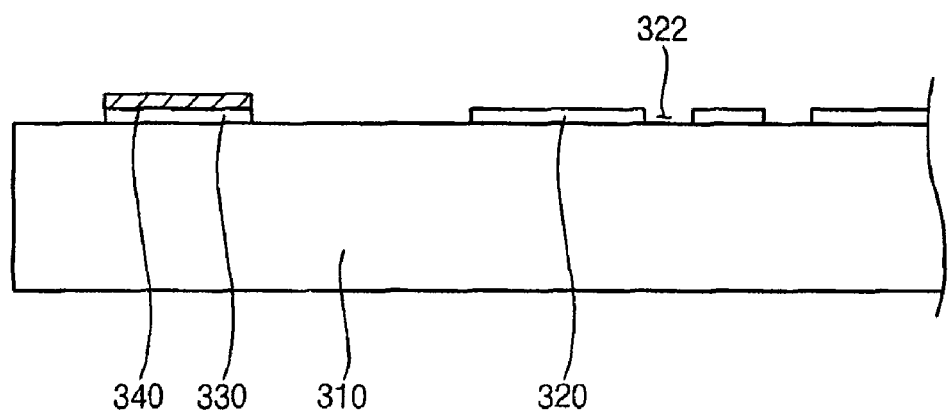
FIG. 3 is a cross-sectional view taken along the line I-I' in FIG. 2.

FIG. 2 is a plan view illustrating the second display substrate in FIG. 1, and FIG. 3 is a cross-sectional view taken along a line I-I' in FIG. 2.

Referring to FIGS. 1 to 3, the second display substrate 300 includes a second insulating substrate 310, a common electrode 320, a dummy pattern 330 and a key pattern 340.

The second insulating substrate 310 comprises a transparent material, such as glass or plastic. The second insulating substrate 310 has a display area DA and a non-display area NDA. Images are displayed in the display area DA. The non-display area NDA surrounds the display area DA.

The common electrode 320 is formed in the display area DA of the second insulating substrate 310. The common electrode 320 is formed on an inner surface of the second insulating substrate 310. The liquid crystal layer 400 is interposed between the common electrode 320 and the pixel electrode 240.

The common electrode 320 comprises a transparent conductive material, through which light may be transmitted. The common electrode 320 may comprise, for example, indium tin oxide (ITO) or indium zinc oxide (IZO). The common electrode 320 may also include an opening pattern 322 to divide each of the pixel parts into a plurality of domains to increase a viewing angle. In FIG. 2, the portion denoted as 'A' illustrates the opening pattern 322 formed in each of the pixel parts.

The dummy pattern 330 is formed in the non-display area NDA of the second insulating substrate 310. The dummy pattern 330 is formed from the same material as the common electrode 320. The dummy pattern 330 may comprise, for example, indium tin oxide (ITO) or indium zinc oxide (IZO). These may be used alone or in a combination thereof.

The key pattern 340 is formed in the non-display area NDA of the second display substrate 300 for an alignment between the first display substrate 200 and the second display substrate 300. The key pattern 340 is formed on the dummy pattern 330. The key pattern 340 has substantially the same shape as the dummy pattern 330.

The key pattern 340 comprises an opaque material for the efficient alignment. The key pattern 340 may comprise, for example, an opaque metal. Alternatively, the key pattern 340 may comprise an opaque photoresist.

The dummy pattern 330 and the key pattern 340 may be formed at various positions in the non-display area NDA. For example, the dummy pattern 330 and the key pattern 340 may be formed at four corners of the second insulating substrate 310. The dummy pattern 330 and the key pattern 340 may also have a cross shape. Alternatively, the dummy pattern 330 and the key pattern 340 may have various shapes, such as a square or concentric ring.

Figure 4:
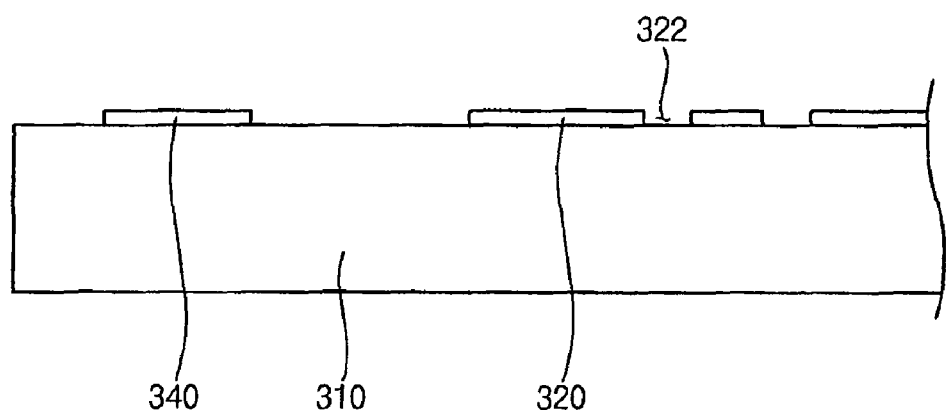
FIG. 4 is a cross-sectional view illustrating a second display substrate according to another exemplary embodiment of the present invention.

FIG. 4 is a cross-sectional view illustrating a second display substrate 300 of FIG. 2 according to another exemplary embodiment of the present invention. The second display substrate 300 of FIG. 4 is substantially the same as in FIG. 3 except for a key pattern 340. Thus, the same reference numerals will be used to refer to the same or like parts as those described in FIG. 3 and any further explanation concerning the above elements will be omitted.

Referring to FIGS. 2 and 4, the key pattern 340 is formed in a non-display area NDA of a second insulating substrate 310 from the same material as a common electrode 320. The key pattern 340 may comprise, for example, indium tin oxide (ITO) or indium zinc oxide (IZO). When the common electrode 320 is formed on the second insulating substrate 310, the key pattern 340 is simultaneously formed on the second insulating substrate 310, so that no additional process may be required.

Figure 5:
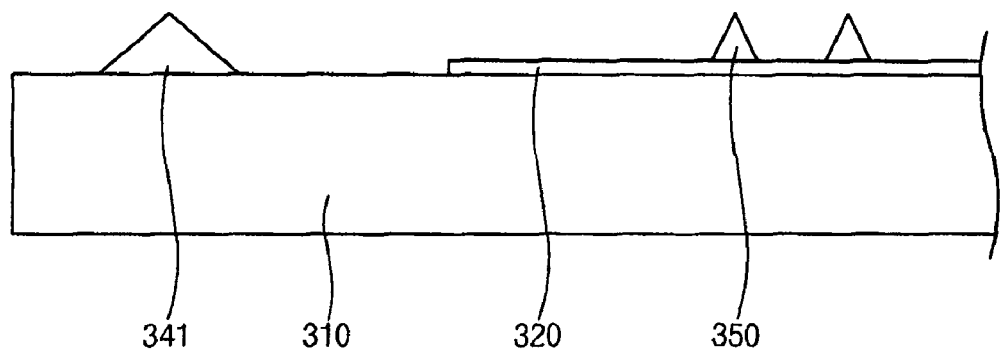
FIG. 5 is a cross-sectional view illustrating a second display substrate according to still another exemplary embodiment of the present invention.

FIG. 5 is a cross-sectional view illustrating a second display substrate according to still another exemplary embodiment of the present invention.

Referring to FIG. 5, the second display substrate 300 may further include a protrusion pattern 350 formed on a common electrode 320 in a display area DA to increase a viewing angle. The protrusion pattern 350 may comprise, for example, a transparent organic material or a transparent inorganic material.

A key pattern 341 is formed in a non-display area NDA of a second insulating substrate 310 from the same material as the protrusion pattern 350. When the protrusion pattern 350 is formed on the common electrode 320, the key pattern 341 is simultaneously formed on the second insulating substrate 310, so that no additional process may be required.

When the key pattern 341 is formed from a transparent material such as the common electrode 320 or the protrusion pattern 350, a process of alignment is performed through a sensor system that discerns the key pattern 341 through a difference of the refractive index or the reflectance between the key pattern 341 and the second insulating substrate 310.

Referring again to FIG. 1, the liquid crystal layer 400 interposed between the first display substrate 200 and the second display substrate 300 includes liquid crystal molecules arranged in a constant direction or variable directions. The liquid crystal molecules have optical and electrical characteristics such as anisotropic refractivity or anisotropic permittivity. The liquid crystal molecules vary arrangement in response to an electric field formed between the pixel electrode 240 and the common electrode 320, and therefore, the light transmittance of the liquid crystal layer 400 is changed.

The second display substrate 300 does not include a black matrix. The first display substrate 200 may include a light-blocking layer (not shown) instead of the black matrix. The light-blocking layer may be formed from an opaque metal layer to form the gate or data lines.

Hereinafter, a method of manufacturing the second display substrate 300 shown in FIGS. 2 and 3 will be explained.

Figure 6:
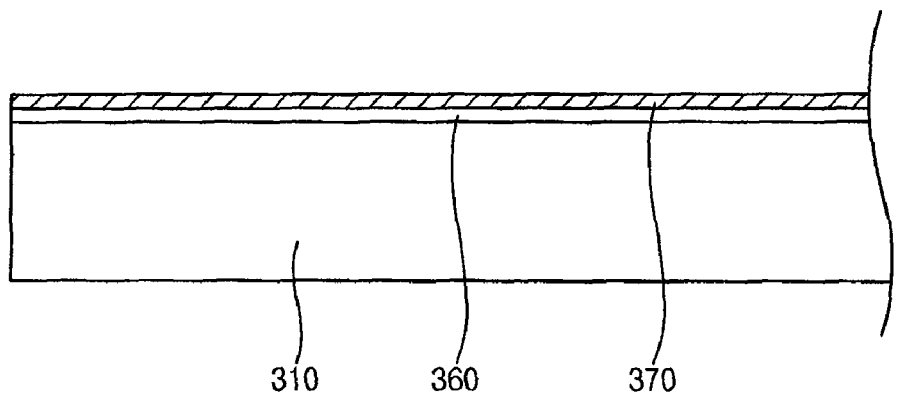
FIGS. 6 to 10 are cross-sectional views illustrating a first method of manufacturing the second display substrate shown in FIG. 2.

FIGS. 6 to 10 are cross-sectional views illustrating a first method of manufacturing the second display substrate 300 shown in FIG. 2. FIG. 6 is a cross-sectional view illustrating the forming of a transparent conductive layer and an opaque metal layer on a transparent insulating substrate.

Referring to FIG. 6, a transparent conductive layer 360 and an opaque metal layer 370 are sequentially formed on the transparent insulating substrate 310. The transparent conductive layer 360 may comprise, for example, indium tin oxide (ITO) or indium zinc oxide (IZO).

Figure 7:
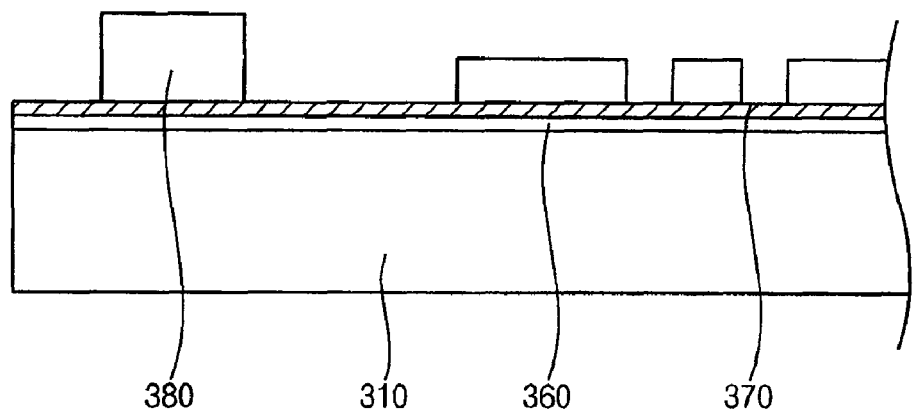

FIG. 7 is a cross-sectional view illustrating the forming of a photoresist pattern on the opaque metal layer shown in FIG. 6.

Referring to FIGS. 2 and 7, a photoresist pattern 380 is formed on the opaque metal layer 370. The photoresist pattern 380 has a first thickness in a key pattern region and a second thickness that is smaller than the first thickness in a common electrode region because the photoresist pattern 380 is formed through one photolithography process using a slit mask or a half-tone mask. The forming of the photoresist pattern 380 may be accomplished by using a positive-type photoresist or a negative-type photoresist. An exposed area of the positive-type photoresist is developed by a developer, and an unexposed area of the negative-type photoresist is developed by a developer.

Figure 8:
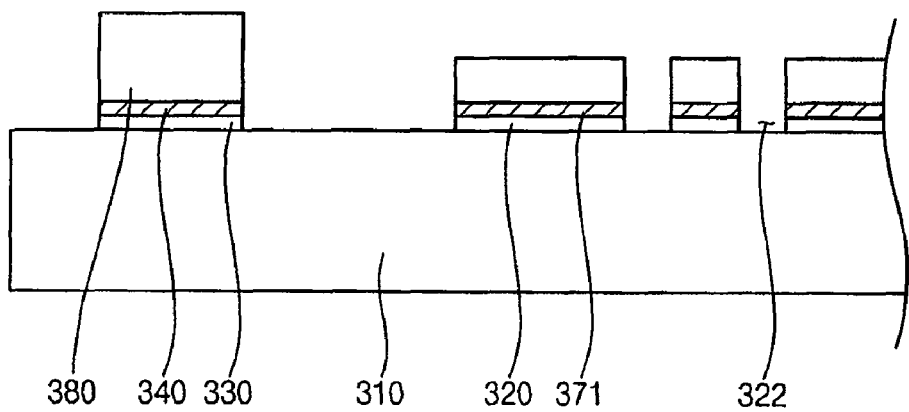

FIG. 8 is a cross-sectional view illustrating the patterning of the opaque metal layer and the transparent conductive layer shown in FIG. 7.

Referring to FIGS. 2, 7 and 8, the opaque metal layer 370 and the transparent conductive layer 360 are patterned through a patterning process using the photoresist pattern 380. For example, the opaque metal layer 370 and the transparent conductive layer 360 are first etched through the patterning process using the photoresist pattern 380.

A common electrode 320, a dummy pattern 330, a key pattern 340, and an opaque metal pattern 371 are formed through the patterning process using the photoresist pattern 380. The common electrode 320 is formed in the display area DA of the second insulating substrate 310 from the transparent conductive layer 360. The dummy pattern 330 is formed from the transparent conductive layer 360 in the non-display area NDA of the second insulating substrate 310. The opaque metal pattern 371 is formed from the opaque metal layer 371. The key pattern 340 which is one part of the opaque metal pattern 371 is formed on the dummy pattern 330. A portion of the opaque metal pattern 371 is formed on the common electrode 320. When the opaque metal layer 370 and the transparent conductive layer 360 are patterned through the patterning process using the photoresist pattern 380, the opening pattern 322 that is formed within the area of the common electrode 320, may be simultaneously formed.

Figure 9:
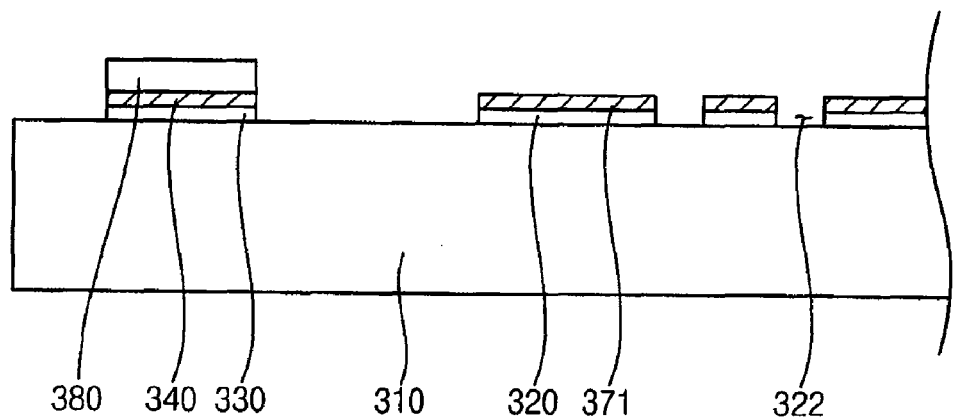

FIG. 9 is a cross-sectional view illustrating the ashing of the photoresist pattern shown in FIG. 8.

Referring to FIG. 9, an ashing process is performed to reduce the thickness of the photoresist pattern 380 by a predetermined thickness. According to the ashing process, the photoresist pattern 380 on the common electrode region is removed so that the opaque metal pattern 371 on the common electrode 320 is exposed, and the ashed photoresist pattern 380 on the key pattern region remains.

Figure 10:
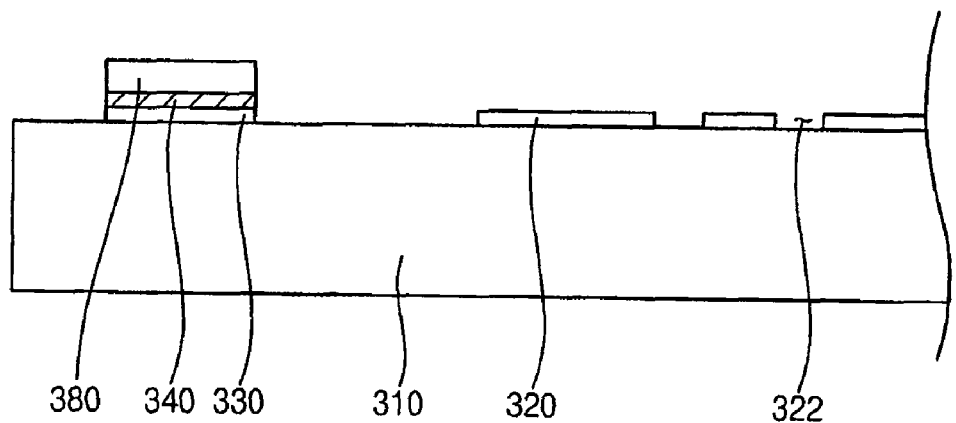

FIG. 10 is a cross-sectional view illustrating the etching of the opaque metal layer shown in FIG. 9.

Referring to FIG. 10, the opaque metal pattern 371 remaining on the common electrode 320 is selectively etched through a patterning process using the ashed photoresist pattern 380. According to the patterning process using the ashed photoresist pattern 380, the common electrode 320 only remains in the common electrode region.

Then, the ashed photoresist pattern 380 remaining on the key pattern 340 is stripped. Thus, a manufacturing process of the second display substrate 300 shown in FIG. 3 is completed.

As described above, the common electrode 320 and the key pattern 340 are simultaneously formed through one patterning process using one mask, so that a process of manufacturing the second display substrate 300 may be simplified.

Figure 11:
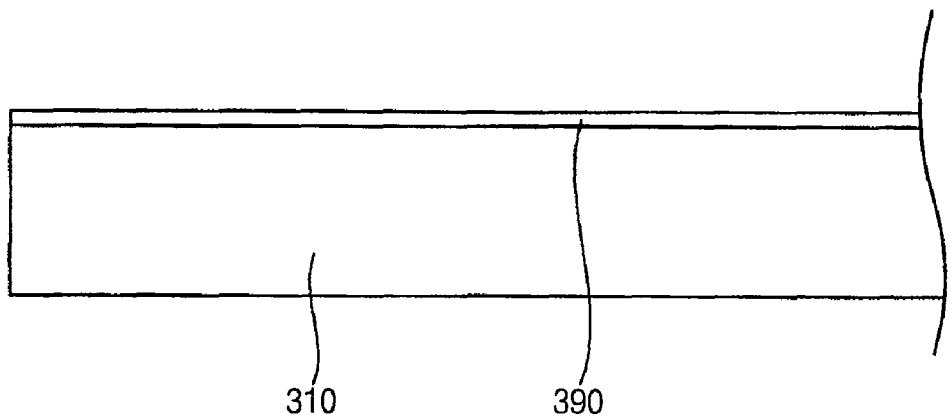
FIGS. 11 to 14 are cross-sectional views illustrating a second method of manufacturing the second display substrate shown in FIG. 2.

FIGS. 11 to 14 are cross-sectional views illustrating a second method of manufacturing the second display substrate 300 shown in FIG. 2. FIG. 11 is a cross-sectional view illustrating the forming of a transparent conductive layer on a transparent insulating substrate.

Referring to FIG. 11, a transparent conductive layer 390 is formed on the second transparent insulating substrate 310. The transparent conductive layer 390 may comprise, for example, indium tin oxide (ITO) or indium zinc oxide (IZO).

Figure 12:
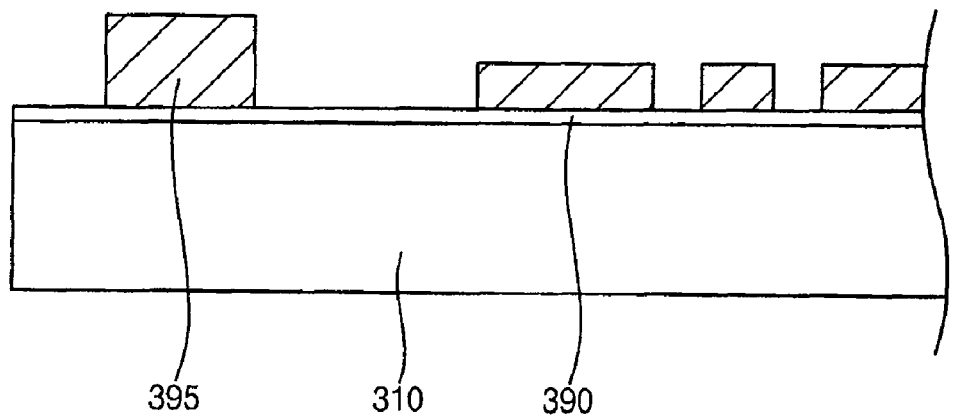

FIG. 12 is a cross-sectional view illustrating the forming of an opaque photoresist pattern on the transparent conductive layer shown in FIG. 11.

Referring to FIGS. 2 and 12, an opaque photoresist pattern 395 is formed on the transparent conductive layer 390. The opaque photoresist pattern 395 has a first thickness in the key pattern region and a second thickness that is smaller than the first thickness in a common electrode region. The opaque photoresist pattern 395 may be formed through one photolithography process using a slit mask or a half-tone mask. The opaque photoresist pattern 395 may include a positive-type photoresist or a negative-type photoresist. An exposed area of the positive-type photoresist and an unexposed area of the negative-type photoresist are developed by a developer.

Figure 13:
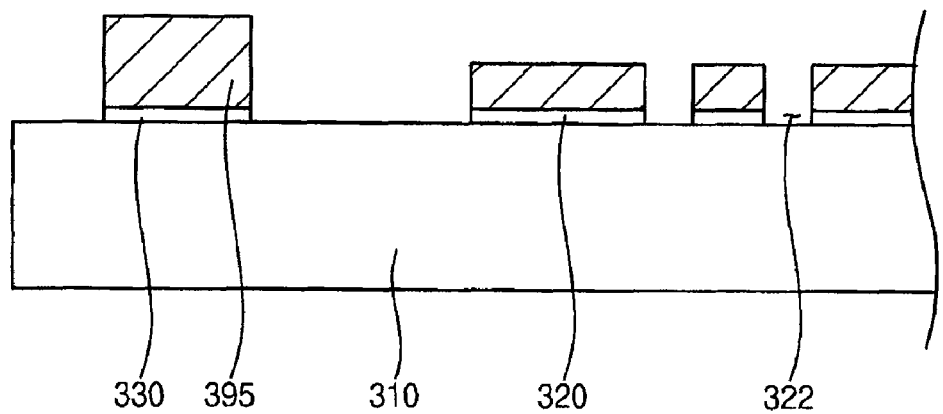

FIG. 13 is a cross-sectional view illustrating the patterning of the transparent conductive layer using the opaque photoresist pattern shown in FIG. 12.

Referring to FIGS. 2, 12 and 13, the transparent conductive layer 390 is patterned through a patterning process using the opaque photoresist pattern 395.

The common electrode 320 and the dummy pattern 330 are formed through the patterning process using the opaque photoresist pattern 395. The common electrode 320 is formed in the display area DA of the second insulating substrate 310 from the transparent conductive layer 390. The dummy pattern 330 is formed in the non-display area NDA of the insulating substrate 310 from the transparent conductive layer 390. When the transparent conductive layer 390 is patterned through the patterning process using the opaque photoresist pattern 395, the opening pattern 322 that is formed through the common electrode 320 may be simultaneously formed.

Figure 14:
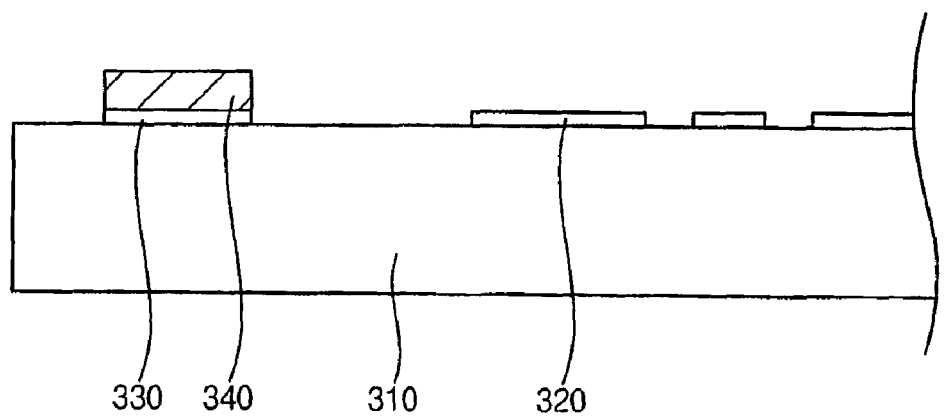

FIG. 14 is a cross-sectional view illustrating the ashing of the opaque photoresist pattern shown in FIG. 13.

Referring to FIG. 14, an ashing process is performed to reduce the thickness of the opaque photoresist pattern 395 by a predetermined thickness. According to the ashing process, the common electrode 320 is exposed, and the opaque photoresist pattern 395 becomes a key pattern 340 which is formed on the dummy pattern 330.

As described above, the common electrode 320 and the key pattern 340 are simultaneously formed through one patterning process using one mask, so that a process of manufacturing the second display substrate 300 may be simplified.

According to the present invention, the common electrode formed on the display area of the display substrate and the key pattern formed on the non-display area of the display substrate are simultaneously formed through the same patterning process using one mask, so that the process of manufacturing the display substrate may be simplified.

Additionally, the black matrix and the overcoating layer may be removed in the display substrate, so that manufacturing costs may be greatly decreased and light transmittance may be increased.

Having described the exemplary embodiments of the present teachings and their advantages, it is noted that various changes, substitutions and alterations can be made herein without departing from the spirit and scope of the present disclosure.

What is claimed is:

1. A method of manufacturing a display apparatus, the method comprising:
    providing a first substrate;
    providing a second substrate having a transparent insulating portion subdivided to have a display area and a non-display area, where the first substrate is to be spaced apart from and cooperatively aligned with in facing relation with the second substrate;
    forming a transparent conductive layer on the transparent insulating portion of the second substrate such that the formed transparent conductive layer extends over both of the display area and the non-display area of the transparent insulating portion;
    forming an opaque material layer on the transparent conductive layer such that the formed opaque material layer extends over both of the display area and the non-display area of the transparent insulating portion and such that the formed opaque material layer has a first opaque part with a first thickness disposed in the non-display area and a second opaque part with a smaller second thickness disposed in the display area;
    simultaneously patterning the transparent conductive layer and the first and second opaque parts of the opaque material layer to thereby form an exposed transparent common electrode and an alignment enabling key pattern where the formed key pattern includes a dummy pattern portion formed from the transparent conductive layer and an opaque pattern portion formed from a remnant of the relatively thick first opaque part of the opaque material layer.

2. The method of claim 1, wherein the opaque material layer includes an opaque metal layer.

3. The method of claim 2 further comprising forming a photoresist pattern on the opaque metal layer, the photoresist pattern having a first thickness over the first opaque part that will form the opaque pattern portion of the key pattern and a second thickness that is smaller than the first thickness and is disposed over the second opaque part that will form over the area of the to-be-exposed common electrode.

4. The method of claim 3, wherein the photoresist pattern is formed through a photolithography process using a half-tone mask or a slit mask.

5. The method of claim 4, wherein the forming of the exposed transparent common electrode and the key pattern, comprises:
    simultaneously patterning the opaque metal layer and the transparent conductive layer by using the photoresist pattern having the different thicknesses as a patterning mask;
    ashing the photoresist pattern after using it for said simultaneous patterning so that a portion of the opaque metal layer formed over the area of the to-be-exposed common electrode is exposed;
    etching away the exposed portion of the opaque metal layer to thereby expose the to-be-exposed transparent common electrode;
    stripping the ashed photoresist pattern away after exposing the common electrode.

6. The method of claim 1, wherein the opaque material layer is an opaque photoresist.

7. The method of claim 6 wherein the opaque photoresist pattern is formed through a photolithography process using a half-tone mask or a slit mask.

8. The method of claim 7, wherein the opaque photoresist pattern comprises a positive-type photoresist or a negative-type photoresist.

9. The method of claim 6, wherein during said simultaneous patterning of the transparent conductive layer and the first and second opaque parts of the opaque material layer, which simultaneous patterning forms the exposed transparent common electrode and the key pattern, the opaque photoresist pattern is partially ashed away to thereby selectively expose the transparent common electrode while not exposing the dummy pattern portion of the key pattern.

10. The method of claim 1, wherein the formed alignment enabling key pattern includes first and second linear sections crossing with each other.

11. The method of claim 10, wherein the simultaneous patterning of the transparent conductive layer and the first and second opaque parts of the opaque material layer forms not only the first recited alignment enabling key pattern but also forms an additional second and third alignment enabling key pattern in the non-display area, the first recited and the second and third alignment enabling key patterns being spaced apart from each other.

* * * * *